United States Patent [19]

Hirabayashi et al.

[11] Patent Number: 5,280,952
[45] Date of Patent: Jan. 25, 1994

[54] AIRBAG ARRANGEMENT FOR AN AUTOMOTIVE VEHICLE

[75] Inventors: Hirokazu Hirabayashi; Hironori Yoshikawa, both of Kanagawa Pref., Japan

[73] Assignee: Nissan Motor Co., Ltd., Yokohama City, Japan

[21] Appl. No.: 631,144

[22] Filed: Dec. 20, 1990

[30] Foreign Application Priority Data

Jan. 10, 1990 [JP] Japan .................................. 2-1493

[51] Int. Cl.⁵ ................................................ B60R 21/28
[52] U.S. Cl. ................................. 280/739; 280/743 R
[58] Field of Search ............... 280/743, 728, 739, 738, 280/731

[56] References Cited

U.S. PATENT DOCUMENTS

| | | | |
|---|---|---|---|
| 3,807,754 | 4/1974 | Rodenbach et al. | 280/743 |
| 4,004,828 | 1/1977 | Sogabe | 280/743 |
| 4,805,930 | 2/1989 | Takada | 280/743 |
| 5,114,180 | 5/1992 | Kami et al. | 280/743 R |

FOREIGN PATENT DOCUMENTS

| | | | |
|---|---|---|---|
| 2264053 | 7/1973 | Fed. Rep. of Germany | 280/743 |
| 2-216342 | 8/1990 | Japan | 280/743 |
| 3-16853 | 1/1991 | Japan | 280/728 |
| 90/01436 | 2/1990 | PCT Int'l Appl. | 280/728 |

OTHER PUBLICATIONS

Nissan, "New Car Manual", Oct. 1989, F-6-F-7.

*Primary Examiner*—Karin L. Tyson
*Attorney, Agent, or Firm*—Leydig, Voit & Mayer

[57] ABSTRACT

An airbag restraint system for an automotive vehicle includes an airbag made up of front and rear sheets which are generally circular and sewn together at their peripheral portions. When retracted in a central part of a steering wheel, the airbag is folded in a deflated condition along two lines which are parallel and separate from each other and located such that a central opening for an inflator is positioned therebetween. A region of the rear sheet between the two bending lines is coated with a coating material to prevent gas flow therethrough. When retracted in the steering wheel, the airbag has a space which is formed between the coated section of the rear sheet and the front sheet, which is coated at its whole surface with the coating material, so that the space is confined by the coated sections of the front and rear sheets. When gas is ejected from an inflator into the space, the airbag can be effectively developed to ensure inflation of the airbag.

16 Claims, 4 Drawing Sheets

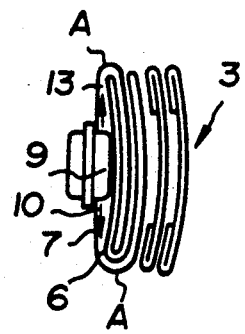
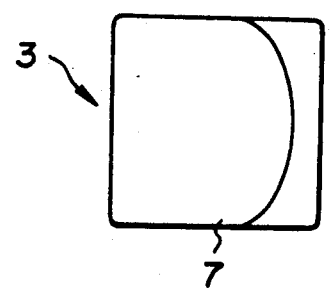
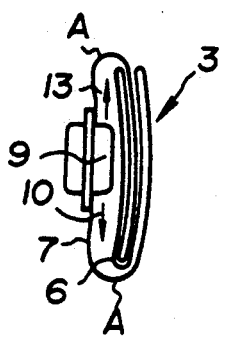
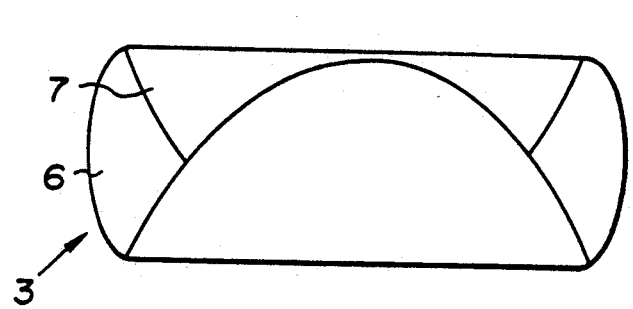
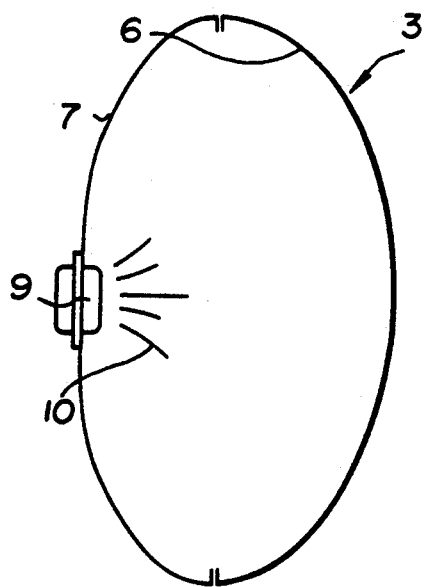
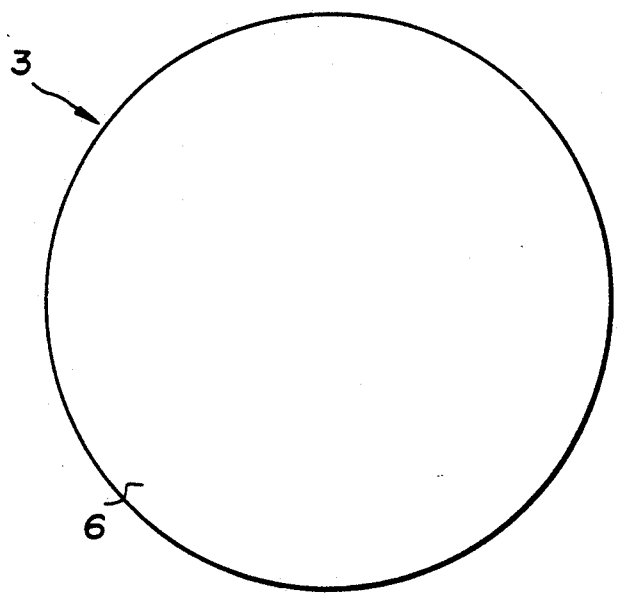

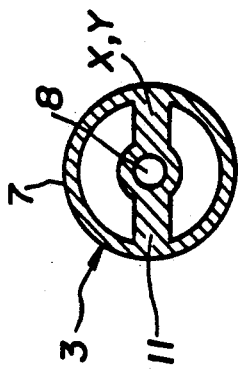
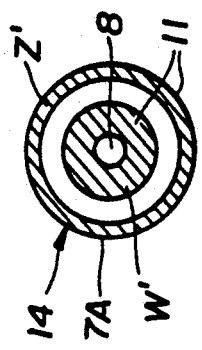
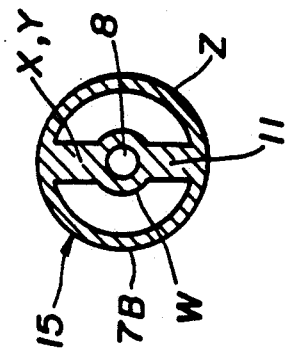
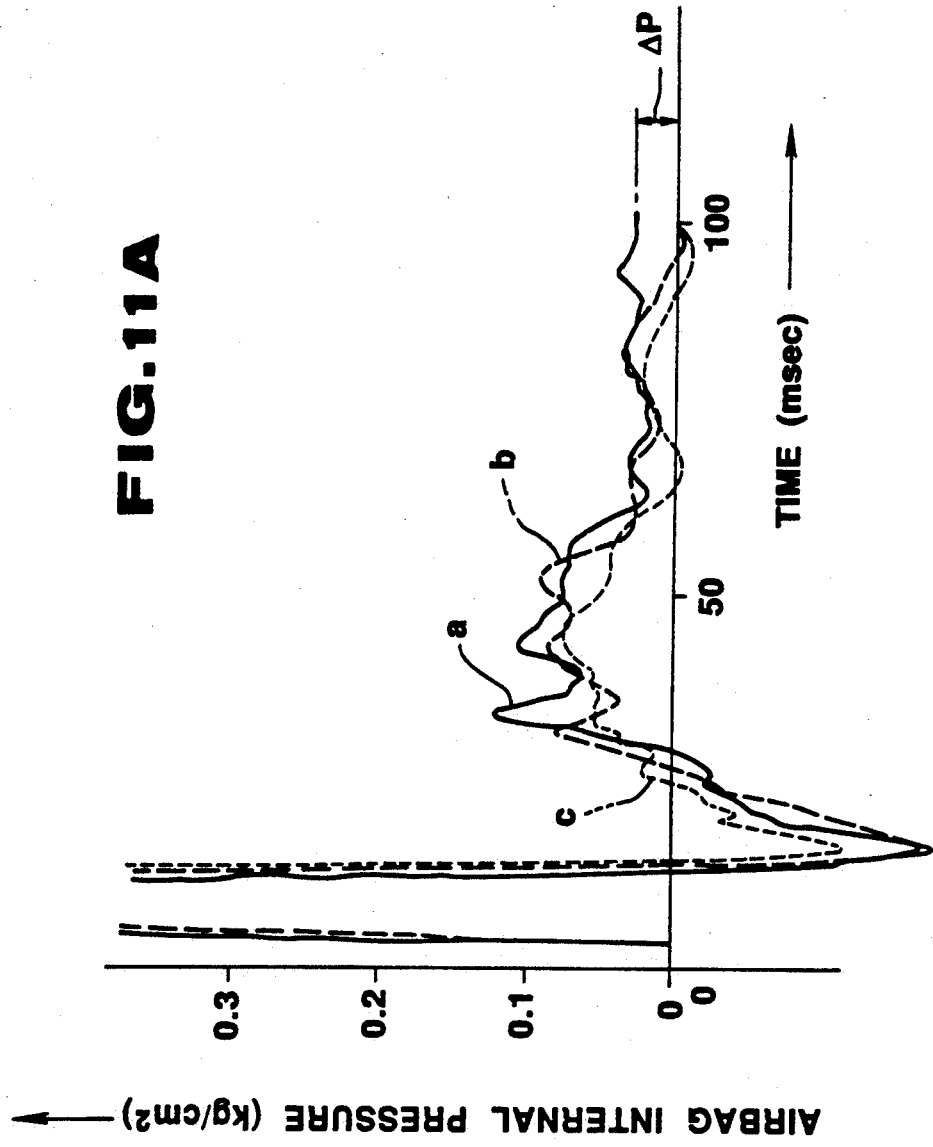

AIRBAG ARRANGEMENT FOR AN AUTOMOTIVE VEHICLE

BACKGROUND OF THE INVENTION

1. Field of the Invention

This invention relates to improvements in an airbag arrangement for protecting a vehicle passenger in the event of a serious vehicle collision, and more particularly to an airbag having an inner surface coated with an elastomeric material to prevent gas from penetrating it.

2. Description of the Prior Art

A variety of airbag arrangements for an automotive vehicle have been proposed and put into practical use. A typical arrangement is configured as follows. An airbag is usually folded and retracted in a central part of a steering wheel and covered with a pad. The airbag is arranged burst the pad to open and to thereby protect a vehicle passenger from coming into direct contact with either the steering wheel or a windshield in the event of a serious vehicle collision. The airbag is made up of front and rear generally annular sheets (woven cloths) which are sewn at their peripheral portion to each other. The rear sheet is formed with a central opening for receiving an inflator or gas generator which ejects nitrogen gas. The front and rear sheets are coated at their inner surface with an elastomeric material to prevent the gas from passing therethrough. Accordingly, the airbag can be inflated when the inflator generates the gas. The rear sheet is formed with gas discharge openings through which a part of the gas inside the airbag is discharged so that the airbag serves as a soft cushion, thereby protecting the passenger.

However, difficulties have been encountered in such a conventional airbag arrangement in which it is necessary to particularly reinforce the inner peripheral portion of the rear sheet around each gas discharge opening in order to prevent the rear sheet from tearing from the gas discharge openings when the gas is forcibly discharged through the gas discharge openings. This increases the number of steps in the production process and raises production costs.

In view of the above, it may be proposed to leave an uncoated section (having no coating) at a part of the rear sheet so as to allow a part of the gas inside the airbag to be discharged. However, it is difficult to determine a suitable location for the uncoated section. In other words, if the uncoated section is formed at an unsuitable location, the gas inside the airbag will be excessively discharged so that the airbag cannot be sufficiently inflated, or the discharge of the gas will be insufficient so that the airbag will not serve as a soft cushion.

SUMMARY OF THE INVENTION

It is an object of the present invention to provide an improved airbag arrangement having an airbag which can be reliably inflated while serving as a soft cushion without forming gas discharge openings through which gas inside the airbag is discharged.

An airbag arrangement of the present invention for an automotive vehicle comprises an airbag which is inflatable and unfoldable into a unfolded condition in which a vehicle passenger is received by the airbag during a vehicle collision, and deflatable and foldable into a folded condition in which the airbag is retracted in a part of a vehicle body. The airbag includes rear and front sheets which are secured to each other to define a bag. The rear sheet is formed with a central opening through which gas is ejected into the airbag. First and second bending lines are defined in the airbag. The airbag is folded along the first and second bending lines prior to folding along other bending lines to obtain a folded condition of the airbag. The first and second bending lines are parallel with each other and opposite to each other so that the central opening is located therebetween. A first coating is formed on a first region of a surface of the rear sheet. The first region generally corresponds to an area of the surface of the rear sheet defined between the first and second bending lines. The gas can penetrate a second region of the surface of the rear sheet which is different from the first region. Additionally, a second coating is formed on the whole surface of the front sheet.

With this arrangement, particularly by virtue of the fact that the coating is formed on the rear sheet in the region between the first and second bending lines along which the airbag is first folded, a space into which the gas from an inflator is first ejected in the folded condition of the airbag is defined by a coated section of the rear sheet and the coated front sheet. Accordingly, the pressure of the gas from the inflator can be effectively received by the space without loss, and therefore the space can be securely expanded under the pressure of the gas. Additionally, when the gas goes beyond the first and second bending lines, it can leak out of the airbag through an uncoated section of the rear sheet, so that the airbag can serve as a soft cushion to softly receive the vehicle passenger. Furthermore, it will be understood that the partly coated rear sheet contributes to decreasing the weight of the airbag as compared with a conventional airbag in which the whole surface of the rear sheet is coated with a coating material, and at the same time facilitates production of the airbag.

BRIEF DESCRIPTION OF THE DRAWINGS

FIGS. 8A, 9A and 10A are schematic cross-sectional views of the airbag of FIG. 2, showing a process of inflating the airbag;

FIGS. 8B, 9B and 10B are schematic front views of the airbag of FIG. 2, showing the inflating process of the airbag as viewed from the location of a vehicle passenger to be protected;

FIG. 11A is a graph showing the internal pressure of the airbag of FIG. 2 and of comparative examples of airbags in terms of time elapsed from the initiation of gas ejection;

FIG. 11B is a schematic front view of the rear sheet of the airbag of FIG. 2, showing a pattern of a coated section;

FIG. 11C is a schematic front view of a rear sheet of a comparative example of an airbag, showing a pattern of a coated section; and FIG. 11D is a schematic front view of a rear sheet of another comparative example of an airbag, showing a pattern of a coated section.

DETAILED DESCRIPTION OF THE INVENTION

Figure 1:
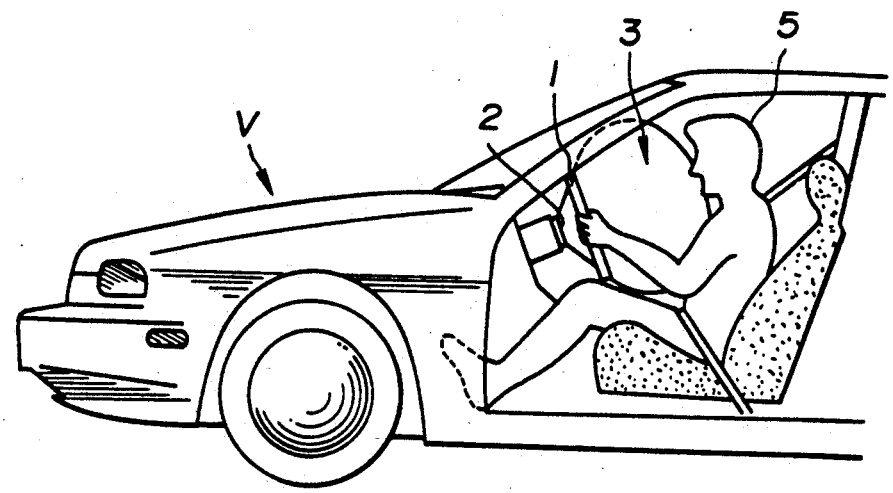
FIG. 1 is a fragmentary schematic side view showing an embodiment of an airbag arrangement of the present invention mounted on an automotive vehicle.
Figure 2:
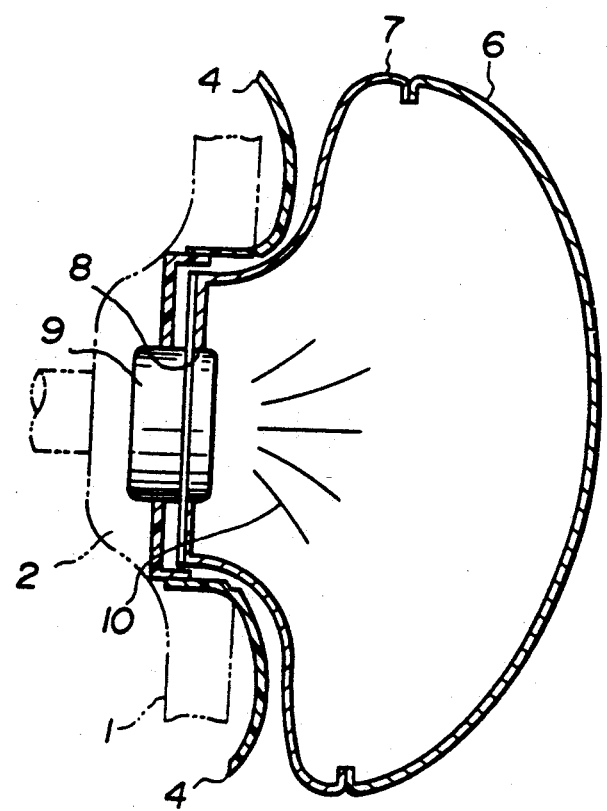
FIG. 2 is a cross-sectional view of the airbag arrangement of FIG. 1 when an airbag is inflated.

FIGS. 1 and 2, show an embodiment of an airbag arrangement of the present invention mounted on an automotive vehicle V. The airbag arrangement forms part of an airbag restraint system for protecting a vehicle passenger 5 in the event of a serious vehicle collision. The airbag arrangement includes an airbag 3 which is usually folded and retracted in a central part 2 of a steering wheel 1 and covered with a pad 4 in this embodiment. The airbag 3 is arranged to burst the pad 4 to open and inflate, as shown in FIG. 2, to thereby to protect the vehicle passenger from coming into direct contact with either the steering wheel 1 or a windshield (not shown) in the event of a serious vehicle collision, as shown in FIG. 1.

The airbag 3 comprises front and rear generally annular sheets (woven cloths) 6, 7 which are sewn at their peripheral portions to each other. The rear sheet 7 is formed with a central opening 8 in which an inflator or gas generator 9 is disposed to eject nitrogen gas 10. The airbag 3 is adapted to inflate under the pressure of the nitrogen gas. In this embodiment, the whole inner surface of the front sheet 6 is coated with an elastomeric material such as rubber, while the inner surface of the rear sheet 7 is partly coated with the elastomeric material.

Figure 4:
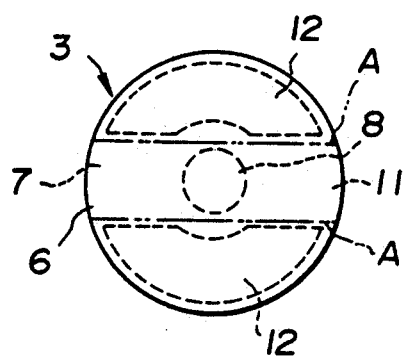
FIGS. 4 to 6 are front elevations of the airbag of FIG. 2, showing a manner of folding the airbag.
Figure 5:
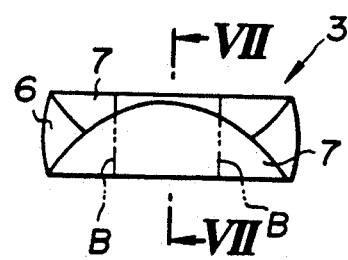

First, a manner of folding the airbag 3 will be explained with reference to FIGS. 4, 5 (7) and 6. As shown in FIG. 4, the airbag 3 in a deflated state has imaginary bending lines A, A which are parallel with each other and opposite to each other with respect to the central opening 8 so that the central opening 8 is located between the bending lines A, A. The airbag 3 is first folded along the bending lines A, A such that one outside part (relative to the upper bending line A) of the airbag 3 is folded on the front sheet 6 at a portion between the bending lines A, A, while the other outside part (relative to the lower bending line A) of the airbag 3 is folded on the above-mentioned one outside part which has been already folded, thereby obtaining an intermediate condition of the airbag 3 shown in FIGS. 5 and 7. In the state of FIG. 5, two folded portions of the rear sheet 7 lie upon one another. As shown in FIG. 5, the thus folded airbag 3 has imaginary bending lines B, B which are parallel with each other and located opposite to each other with respect to the central opening 8 so that the central opening 8 is located between the bending lines B, B. Bending lines B, B are generally perpendicular to bending lines A, A. Subsequently, the airbag 3 is folded such that one outside part (relative to the right bending line B) of the airbag 3 is folded on the already folded rear sheet 7 while the other outside part (relative to the left bending line B) is folded on the already folded one outside part, thereby obtaining the final folded condition of the airbag 3 shown in FIG. 6.

Figure 3:
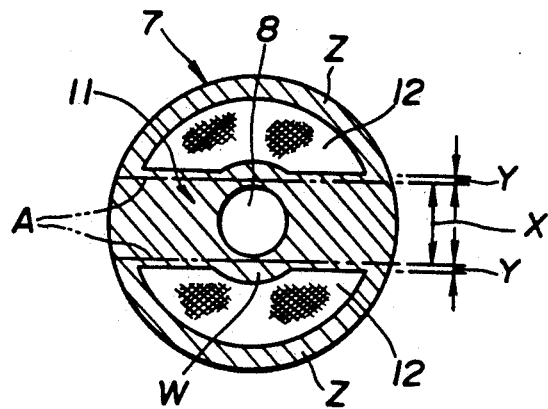
FIG. 3 is a front view of a rear sheet (at its inner surface) of the airbag of FIG. 2.

Next, coating of the elastomeric material for the rear sheet 7 of the airbag 3 will be discussed with reference to FIG. 3. A coating of the elastomeric material is formed on inside surface portions (hatched in FIG. 3) including a region X between the bending lines A, A, regions Y, Y each defined between the bending line A and a line located outside 10 mm of the nearer bending line A, two arcuate regions Z, Z forming part of the outer peripheral portion of the rear sheet 7, and two regions W, W forming part of the inner peripheral portion of the rear sheet 7, thereby forming a coated section 11. The coatings at all of regions X, A, A, Z, Z, W, W are integral with each other. It will be understood that gas cannot penetrate the coated section 11 of the rear sheet 7. The other portions of the rear sheet 7 are not coated with the elastomeric material thereby forming an uncoated section 12 which gas can penetrate.

Next, a process of inflating the airbag 3 will be discussed with reference to FIGS. 8A to 10B in which each of FIGS. 8A, 9A and 10A is a schematic cross-sectional view while each of FIGS. 8B, 9B and 10B is a schematic front view as viewed from the portion of a vehicle passenger 5 to be protected by the airbag 3. As shown in FIG. 8A illustrating a folded and retracted condition of the airbag 3, a space 13 into which nitrogen gas 10 from the inflator 9 is first supplied is defined by the region X (between the bending lines A, A) of the rear sheet 12 and a corresponding or facing portion of the front sheet 6. Since the region X of the front sheet 6 and the corresponding portion of the rear sheet 7 are coated with the elastomeric material forming part of the coated section 11, the space 13 is considered to be a confined space maintaining a gas-tight seal.

Figure 6:
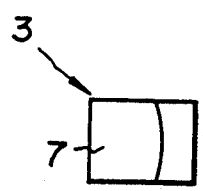
Figure 7:
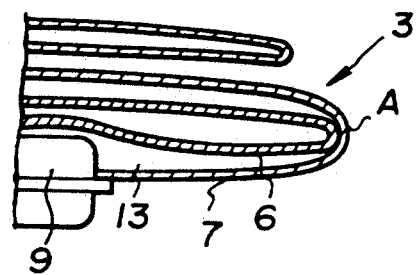
FIG. 7 is a fragmentary sectional view taken in the direction of arrows substantially along line VII—VII in FIG. 5.

It will be understood that this space 13 is formed by the first folding operation of the airbag 3 in a folding process to obtain the folded condition of FIG. 6, and therefore the highest reaction or resistance force is developed when the space 13 is expanded under the pressure of the gas from the inflator 9 to inflate the airbag 3. However, since the portions of the front and rear sheets 6, 7 defining the space 13 are coated with the elastomeric material, the gas ejected from the inflator 9 is fully received in the space 13 without being released out of the space 13 as shown in FIGS. 8A and 8B, so the space 13 is momentarily inflated. When the space 13 once inflates a little, the parts folded along bending lines B, B are unfolded outwardly as shown in FIGS. 9A and 9B.

After such a partial unfolding of the airbag 3, the gas can spread throughout the inside of the airbag 3 without a high reaction or resistance force. Accordingly, the gas ejected from the inflator 9 is smoothly spread from the space 13 throughout the whole inside space of the airbag 3, thereby unfolding the folded parts of the airbag 3 outside the bending lines A, A. As a result, the airbag 3 is brought into a fully inflated condition as shown in FIG. 10A and 10B. In this condition, a part of the gas filled in the airbag 3 is released through the uncoated section 12 (outside the bending lines A, A) of the rear sheet 7, so that the airbag 3 serves as a soft cushion.

Thus, according to this embodiment, conflicting requirements for obtaining a reliable inflation of the airbag 3 and obtaining a soft cushion effect can be effectively satisfied. It is to be noted that if the coated section 11 in the rear sheet 7 is erroneously located, the internal pressure of the airbag 3 cannot sufficiently rise and therefore a reliable inflation of the airbag 3 cannot be expected. This was experimentally proved and will be discussed with reference to FIGS. 11A to 11E.

In an experiment, the internal pressure of three kinds of airbags 3, 14, 15 shown respectively in FIGS. 11B, 11C and 11D were measured during an inflation (in a period beginning from the initiation of ejection of nitrogen gas from the inflator 9) of the airbag under the effect of nitrogen gas generated from the inflator 9. The airbag 3 of FIG. 11B corresponds to that shown in FIGS. 2 to 10B and therefore is within the scope of the present invention. The test result for the airbag 3 of FIG. 11B is indicated by a solid line a in FIG. 11A. The airbags 14, 15 shown in FIGS. 11C and 11D are comparative examples which are not within the scope of the present invention. In the airbag 14 in FIG. 11C which was the same as that of FIGS. 2 to 10B except for a rear sheet 7A, an annular outer peripheral zone Z' and an annular inner peripheral zone W' of the inner surface of the rear sheet (7A) were coated with the elastomeric material to form coated sections 11. The test result for the airbag 14 of FIG. 11C is indicated by a broken line b in FIG. 11A. In the airbag 15 in FIG. 11D which was the same as that of FIGS. 2 to 10B except for a rear sheet 7B, the pattern of the coated section 11 of the rear side sheet 7B was similar to that of the airbag of FIGS. 2 to 10B with the exception that regions Z' and Y' extended perpendicular to the X and Y regions of the airbag 3 of FIG. 11B. In other words, the regions X' and Y' extended perpendicular to the bending lines A, A. The test result for the airbag 15 of FIG. 11D is indicated by a dotted line c in FIG. 11A.

As seen from FIG. 11A, there was a difference ΔP in internal pressure between the airbag 11B and airbags 11C, 11D at a point in time 100 msec after the initiation of ejection of nitrogen gas from the inflator (9). Thus, in the airbag 3 of the present invention, the internal pressure was sufficiently raised to ensure a rapid and sufficient inflation and development of the airbag of the airbag restraint system.

While the airbag 3 has been shown and described as being installed in a steering wheel to protect a driver in the embodiment, it will be understood that the airbag may be installed in an instrument panel to protect a vehicle passenger seated on a front seat by a driver's seat. It will be appreciated that it is sufficient that the airbag 3 be installed in a part of a vehicle body in a manner to protect a vehicle passenger.

What is claimed is:

1. An airbag arrangement for an automotive vehicle comprising:
   an airbag having a periphery and being inflatable from a folded state to an unfolded state, the airbag in the folded state being folded along substantially parallel first and second bending lines each having two ends on the periphery of the airbag, the airbag comprising:
   a first sheet having a surface, a central opening located between the first and second bending lines, a first region which is impermeable to a gas for inflating the airbag and which comprises substantially the entirety of the surface of the first sheet lying between the first and second bending lines, and a second region which is permeable to the gas and is located outside the first region; and
   a second sheet connected to the first sheet so as to form a space between the first and second sheets.

2. An airbag arrangement as claimed in claim 1 further comprising an inflator for generating the gas, a part of the inflator being disposed in the central opening of the first sheet so as to eject the gas against the second sheet.

3. An airbag arrangement as claimed in claim 1 wherein the first and second sheets are generally circular, the first sheet has an annular peripheral portion, and the second sheet has an annular peripheral portion sealingly joined to the annular peripheral portion of the first sheet so that the airbag is circular.

4. An airbag arrangement as claimed in claim 3 wherein the central opening is concentric with the first sheet.

5. An airbag arrangement as claimed in claim 4 wherein the first and second bending lines each have ends lying on the outer peripheral portion of the first sheet.

6. An airbag arrangement as claimed in claim 1 wherein when the airbag is in its folded state, it is folded along third and fourth bending lines substantially perpendicular to the first and second bending lines after being folded along the first and second bending lines.

7. An airbag arrangement as claimed in claim 6 wherein the central opening is positioned between the third and fourth bending lines.

8. An airbag arrangement as claimed in claim 1 wherein substantially the entirety of the second sheet is impermeable to the gas.

9. An airbag arrangement as claimed in claim 1 further comprising a coating impermeable to the gas which is formed on the first region and not on the second region of the first sheet.

10. An airbag arrangement as claimed in claim 9 wherein the coating comprises an elastomeric material.

11. An airbag arrangement as claimed in claim 1 wherein the first sheet comprises a third region which is permeable to the gas, the first region being located between the second and third regions.

12. An airbag arrangement as claimed in claim 11 wherein the first sheet comprises a fourth region which is impermeable to the gas and which surrounds the second and third regions and is connected to the first region.

13. An airbag arrangement as claimed in claim 1 wherein the second region is permeable to the gas when the airbag is in its folded state.

14. An airbag arrangement for an automotive vehicle comprising:
    an airbag having a periphery and being inflatable from a folded state to an unfolded state, the airbag in the folded state being folded along substantially parallel first and second bending lines each having two ends extending to the periphery and then being folded along substantially parallel third and fourth bending lines substantially perpendicular to the first and second bending lines, the airbag comprising:
    a generally circular first sheet made of a material permeable to a gas for inflating the airbag and having a periphery, a central opening located between the first and second bending lines and between the third and fourth bending lines, a first region comprising substantially the entirety of the first sheet between the first and second bending lines, a second region located outside the first region, a third region located outside the first region with the first region lying between the second and third regions, and a generally annular fourth region connected to the first region and surrounding the second and third regions;
    a generally circular second sheet which is impermeable to the gas and has a periphery sealingly connected to the periphery of the first sheet; and
    a coating of an elastomeric material impermeable to the gas applied to the entirety of the first region and the fourth region but not to the second and third regions, whereby the first and fourth regions are impermeable to the gas and the second and third regions are permeable to the gas.

15. An airbag arrangement for an automotive vehicle comprising:
    an airbag having a periphery and being inflatable from a folded state to an unfolded state, the airbag in the folded state being folded along substantially parallel first and second bending lines each having two ends on the periphery of the airbag, the airbag comprising:
    a first sheet having a surface, a central opening located between the first and second bending lines, a first region which is impermeable to a gas for inflating the airbag and which comprises substantially the entirety of the surface of the first sheet lying between the first and second bending lines, a second region which is permeable to the gas and is located outside the first region, a third region which is permeable to the gas, the first region being located between the second and third regions, and a substantially annular fourth region which is impermeable to the gas and which surrounds the second and third regions and is connected to the first region; and
    a second sheet connected to the first sheet so as to form a space between the first and second sheets, substantially the entirety of the second sheet being impermeable to the gas.

16. An airbag arrangement as claimed in claim 1 wherein the first region includes a portion located around the central opening and having an arcuate periphery.

* * * * *